June 25, 1940.  R. D. HANSEN  2,205,723
DELIVERY TRUCK
Filed July 26, 1938   4 Sheets-Sheet 1

Inventor
Ralph D. Hansen

By Clarence A. O'Brien
and Hyman Berman
Attorneys

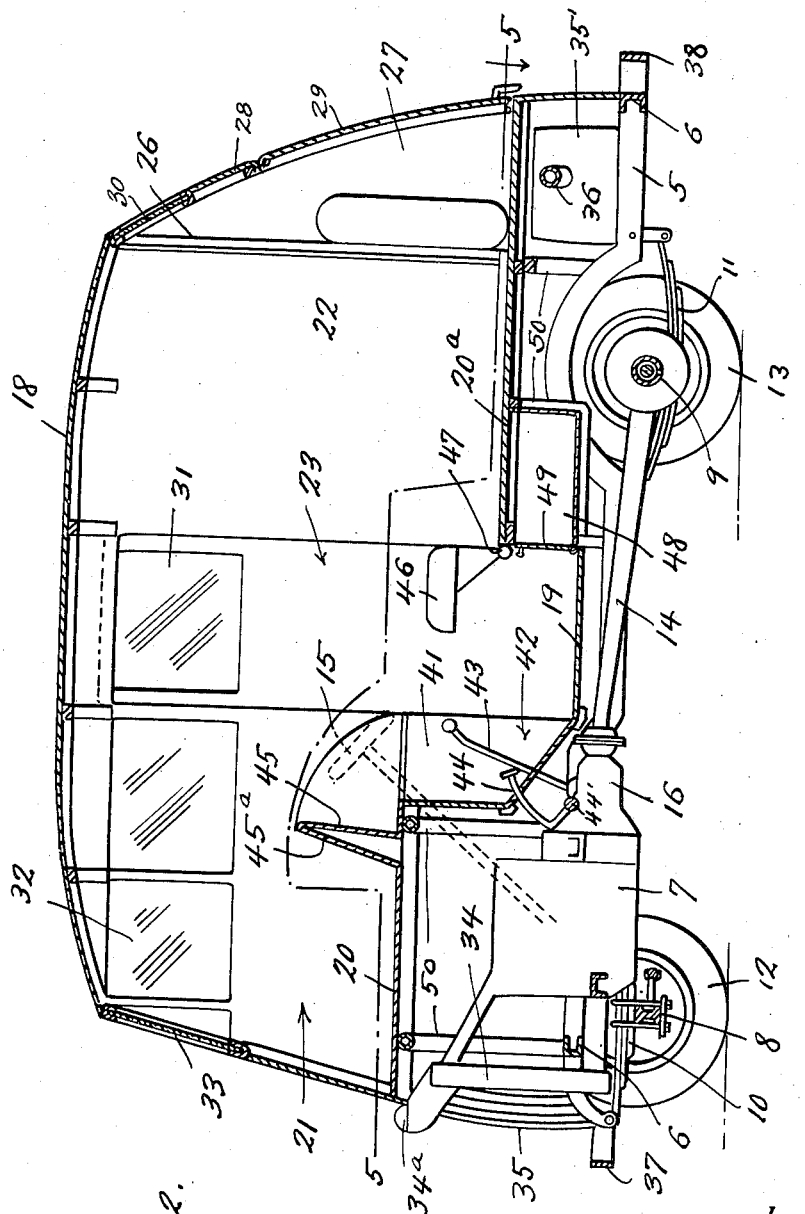

June 25, 1940.  R. D. HANSEN  2,205,723
DELIVERY TRUCK
Filed July 26, 1938  4 Sheets-Sheet 3
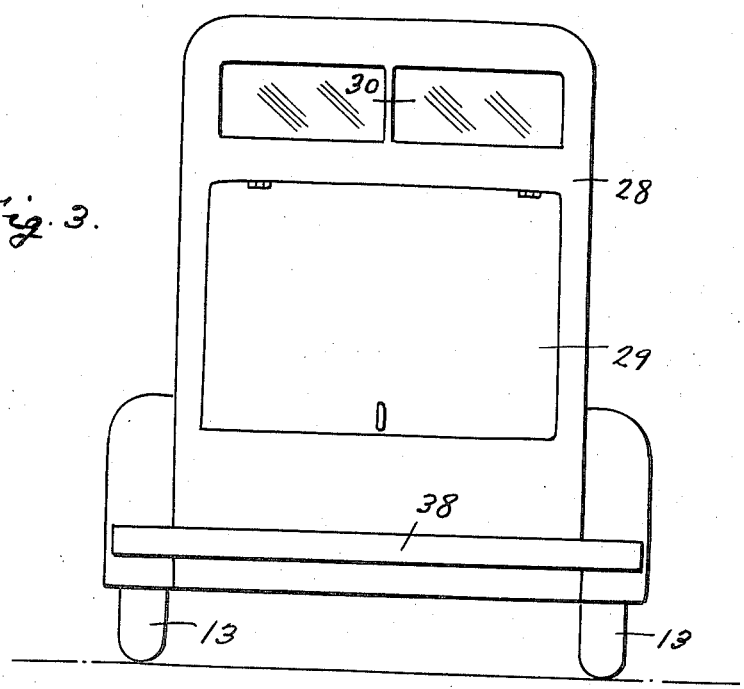
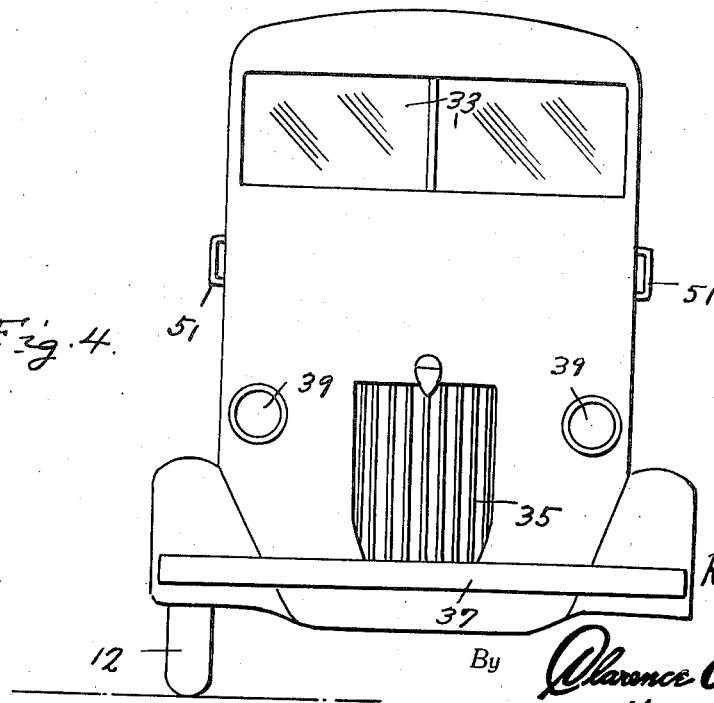
Inventor
Ralph D. Hansen
By Clarence A. O'Brien
and Hyman Berman
Attorneys

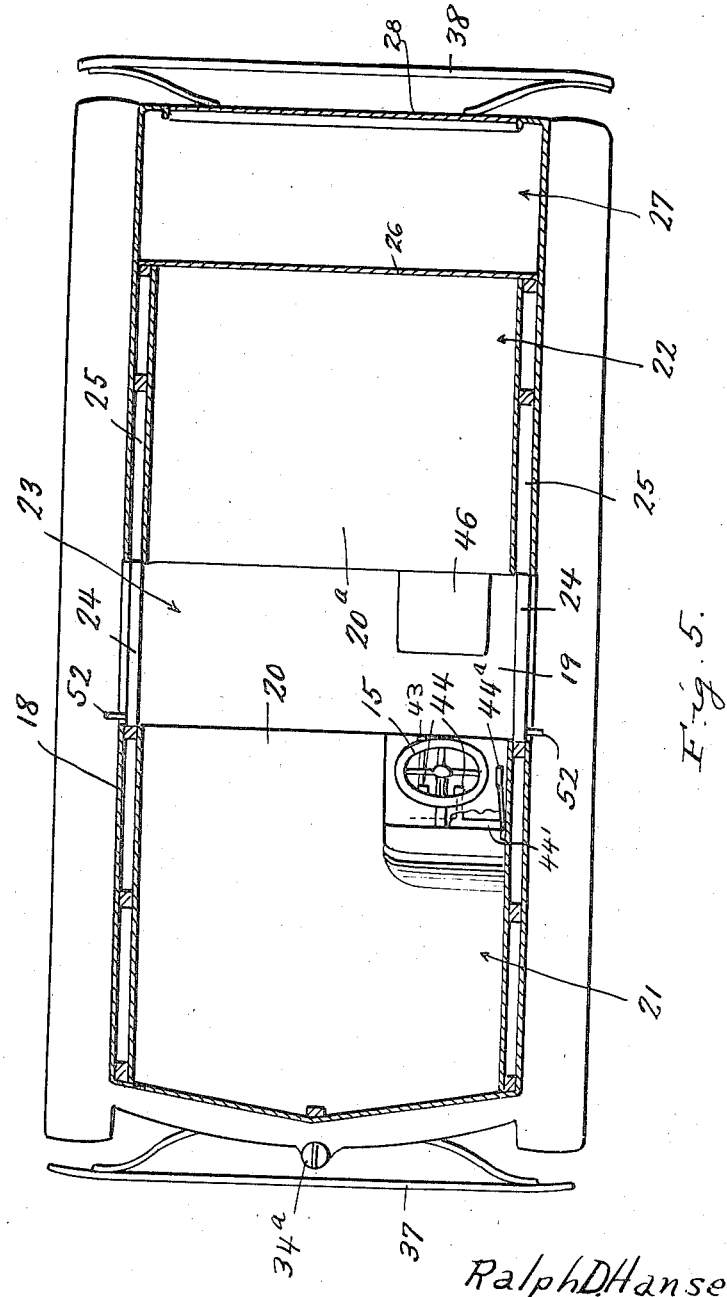

Patented June 25, 1940

2,205,723

UNITED STATES PATENT OFFICE 2,205,723

DELIVERY TRUCK

Ralph D. Hansen, Sioux Falls, S. Dak.

Application July 26, 1938, Serial No. 221,427

1 Claim. (Cl. 280—2)

This invention relates to motor driven delivery trucks and an object of the invention is to provide a truck of this character particularly designed for use on milk delivery routes, the truck being characterized by having a comparatively large carrying capacity located both to the front of and to the rear of the position generally occupied by the driver.

Further in accordance with the present invention, the delivery truck is characterized by a structure permitting the same to be entered and left quickly and easily by the driver.

The invention together with its objects and advantages will be best understood from a reading of the following description taken in connection with the accompanying drawings, wherein—

Figure 2 is a vertical sectional view through the truck.

Figure 3 is a rear elevational view of the truck.

Figure 4 is a front elevational view of the truck.

Figure 5 is a sectional view taken substantially on a line 5—5 of Figure 2.

Figure 1:
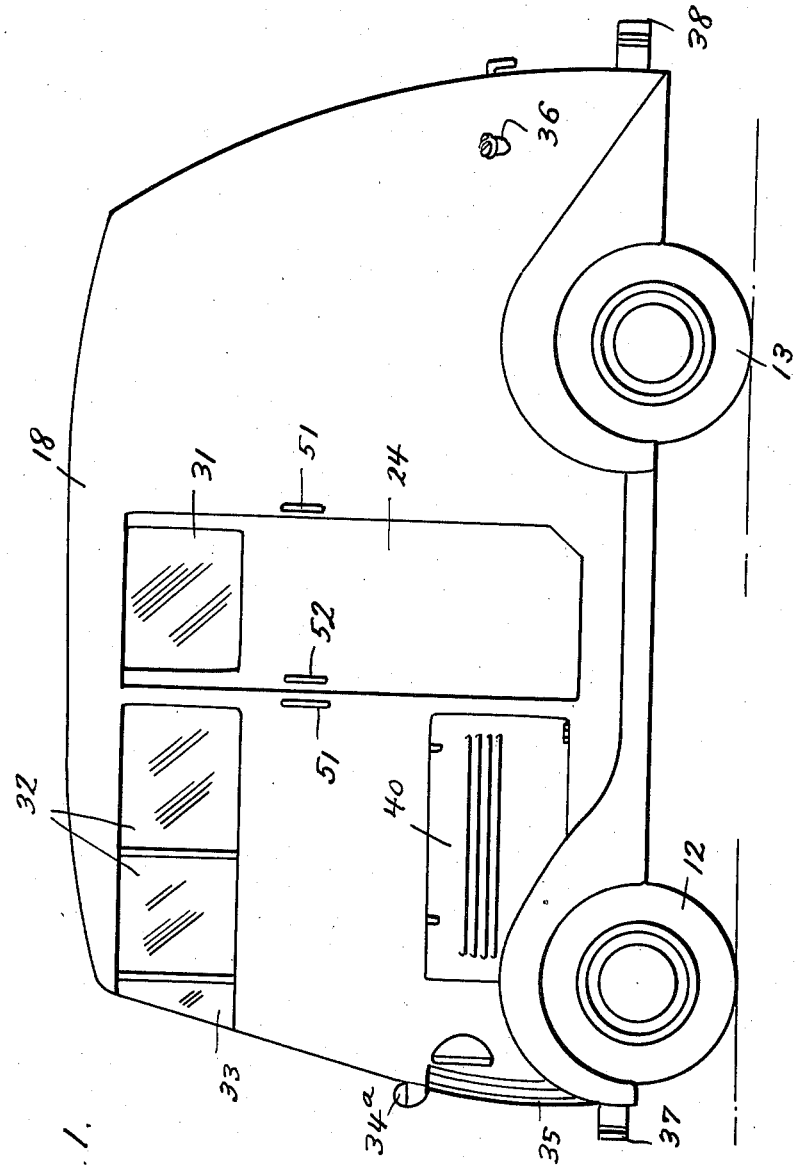
Figure 1 is a side elevational view of the truck.

Referring now more in detail to the drawings, it will be seen that in the preferred embodiment thereof the chassis of the truck is made up of a pair of side sills 5 and cross members 6 connected to the side sills at the front and rear of the truck. A motor 7 of conventional four cylinder form is suitably mounted on the frame at the front of the truck as shown.

The frame and body are supported from axles 8 and 9 by means of springs 10 and 11 secured at their ends to the frame members and at their mid-portions to the axles in any well-known and suitable manner. The axles are supported on wheels 12 and 13 in the usual manner.

Extending from the motor 7 to the rear axle 9 is the drive or propeller shaft 14 to drive the well-known differential mechanism housed therein.

The forward wheels 12 are dirigible and are controlled by the steering wheel 15 through the medium of any suitable steering inter-connection. Interconnected with the motor 7 and the propeller shaft 14 is a transmission 16 which is preferably of the four speed type.

Mounted or built on the frame of the truck is a body 18, which is preferably of the design disclosed and extends substantially the full length of the side sills 5 of the chassis frame. The body embodies a floor having a drop center section 19 and front and rear extensions 20 and 20—a which are mounted over the front and rear axles, with the rear extension 20—a being on a plane materially below the plane of the front floor extension 20. Thus, the body is divided substantially into a forward load compartment 21, a rear load compartment 22 and a center or intermediate driver's compartment 23. For the driver's compartment 23 the body 18 is provided with sliding doors 24 which when open are substantially concealed within the hollows 25 of the side walls of the rear load compartment 22.

The rear wall of the load compartment 22 is formed by a partition 26 and behind the rear compartment 26 is the spare tire and tool compartment 27.

The rear panel 28 of the body 18 is provided with a vertically swinging hinged door 29 which when open, permits access to be had to the spare tire and tool compartment 27. Above the door 29 there are mounted in the panel 28 windows 30.

Also the doors 24 for the driver's compartment 23 are provided in the upper portions thereof with windows 31 while in the upper portion of the portion of the body 8 forming the side walls for the compartment 21, are windows 32.

Also across the front of the body 18 and extending substantially from one side to the other of the body is a windshield 33. Thus provision is made for proper vision of the driver.

As shown in Figure 2, the motor 7 is mounted beneath the front load compartment 21 and the radiator 34 forming part of the cooling system for the motor 7 is disposed behind a grille 35 that is formed as an integral part of the front of the body 18. Also, and as clearly shown in Figure 2, the cap 34—a for the radiator is disposed conveniently at the front of the body exteriorly thereof. The gasoline tank 35' is mounted on the chassis frame beneath the compartment 27 and the filling spout 36 for the tank extends through the body 18 at one side thereof as clearly shown in Figure 1.

Also the vehicle is provided with front and rear bumpers 37—38 and headlights 39.

Also, access to the motor 7 for minor repairs may be had from either side of the body 18, suitable openings in the sides of the body adjacent the front thereof being provided, and for these openings there are provided hinged panels 40.

Also, adjacent one side of the truck body immediately forwardly of the compartment 23, the floor extension 20 has a section thereof removed, and the interior of the body is panelled as at 41 whereby to provide a compartment 42 that accommodates the controls including the steering wheel post, gear shift lever 43 and the pedals which include the brake pedal, clutch pedal and accelerator pedal, as well as the hand brake lever 44a which as suggested in Figures 2 and 5 is suitably connected as at 44' with the brake pedal 44 so that the truck can be operated while the operator is in a standing position just as conveniently as when in a sitting posture. The clutch and associated pedals are not shown as these are located in the conventional manner.

Also, rising from the floor 20 at the top of the control compartment 42 is an instrument panel 45 and this panel is protected by a shield 45—a disposed forwardly of the instrument board 45 and rising from the floor section 20, the shield 45—a merging with the instrument board or panel 45 at the upper edge of the latter as shown.

Also, disposed immediately opposite to the control compartment 42 is a seat 46 for the driver. The seat 46 is hinged as at 47 to the flooring 20—a and is adapted to swing back into a folded position within the compartment 22 relative to the floor 20—a.

Also, beneath the floor 20—a and opposite the control compartment 42 is a compartment 48 having a door 49 accessible from the driver's compartment 23. The compartment 48 may be used for any purpose as desired, and convenient.

It will also be noted that the floor extensions 20 and 20—a are each supported by a suitable upright structure 50 mounted on the chassis frame.

Also, for the convenience of the operator there are provided at opposite sides of the entrances for the compartment 23, hand rails 51 and the sliding doors 24 are provided with handles 52 to facilitate the sliding of the doors to closed and open positions.

Obviously, in actual practice, the compartments 21 and 22 are used for storing the cases of milk or other articles to be delivered and with the articles so stored within the compartments provided therefor they will be within convenient reach to the driver and not interfere with the driver in getting into and out of the truck or in the operating and control of the truck.

It is thought that a clear understanding of the structure, utility and advantages of a delivery truck embodying the features of the present invention will be had without a more detailed description.

Having thus described the invention, what is claimed as new is—

A delivery vehicle comprising a chassis of substantially conventional construction and having a motor at its front end, a body having a floor composed of a low intermediate portion of short length, a raised front portion of longer length and a raised rear portion, uprights on the chassis for supporting the front and rear raised portions of the floor, the front raised portion being located over the motor, said body having door openings rising from the low part of the floor, sliding doors for said door openings, the front raised portion of the floor having an opening in one of its rear corners, panels extending downwardly from the walls of said opening to form a small compartment for the actuating means of the motor, said small compartment opening out into the space formed by the low floor portion, one of the panels forming a floor for the small compartment, vertical panels extending between the low floor portion to the adjacent ends of the front and rear floor portions, an instrument panel extending upwardly from the front floor portion and partly surrounding the opening in said corner thereof and a shield extending from the top of the instrument panel forwardly and downwardly to the front floor portion.

RALPH D. HANSEN.